United States Patent
Kalofonos et al.

(10) Patent No.: US 7,574,510 B2
(45) Date of Patent: Aug. 11, 2009

(54) SYSTEMS, NODES, AND METHODS FOR DYNAMIC END-TO-END SESSION-ENHANCING SERVICES FOR TRANSPORT-LEVEL-BASED CONNECTIONS

(75) Inventors: Dimitris Kalofonos, Cambridge, MA (US); Parijat Shah, Methuen, MA (US)

(73) Assignee: Nokia Corporation, Espoo (FI)

( * ) Notice: Subject to any disclaimer, the term of this patent is extended or adjusted under 35 U.S.C. 154(b) by 768 days.

(21) Appl. No.: 11/167,245

(22) Filed: Jun. 27, 2005

(65) Prior Publication Data
US 2006/0034290 A1   Feb. 16, 2006

Related U.S. Application Data

(60) Provisional application No. 60/592,884, filed on Jul. 30, 2004.

(51) Int. Cl.
*G06F 15/16* (2006.01)
(52) U.S. Cl. .................................... 709/228
(58) Field of Classification Search .......... 709/227–228
See application file for complete search history.

(56) References Cited

U.S. PATENT DOCUMENTS

| 6,628,671 | B1 | 9/2003 | Dynarski et al. | |
|---|---|---|---|---|
| 2002/0097707 | A1* | 7/2002 | Balazinski et al. | 370/351 |
| 2004/0139088 | A1* | 7/2004 | Mandato et al. | 707/100 |
| 2005/0128951 | A1* | 6/2005 | Chawla et al. | 370/235 |

FOREIGN PATENT DOCUMENTS

| EP | 1 343 289 A1 | 9/2003 |
|---|---|---|
| WO | WO 03/063439 A2 | 7/2003 |

OTHER PUBLICATIONS

C. Perkins, "*IP Mobility Support for IPv4*", RFC 3220, Internet Engineering Task Force, Jan. 2002.
J. Rosenberg, H. Schulzrinne, G. Camarillo, A. Johnston, J. Peterson, R. Sparks, M. Handley, and E. Schooler, "*SIP: Session Initiation Protocol*", RFC 3261, Internet Engineering Task Force, Jun. 2002.
T. Okoshi, M. Mochizuki, Y. Tobe, H. Tokuda, "*MobileSocket: Towards Continuous Operation for Java Applications*", IEEE International Conference on Computer Communications and Networks (ICCCN'99), 1999.

(Continued)

*Primary Examiner*—Salad Abdullahi
(74) *Attorney, Agent, or Firm*—Alston & Bird LLP (57) ABSTRACT

Provided are improved systems, nodes, and methods for enabling dynamic end-to-end (e2e) session-enhancing services for transport-level connections such as TCP-based connection sessions, thereby providing the communicating entities the ability to select, adjust, and control e2e session enhancing (e2e-SE) services before and during communications. Embodiments allow for dynamic negotiation and renegotiation of e2e session-enhancing services at establishment of and during the active course of communication sessions, such as at establishment of and during transparent e2e-SE services TCP connections. Embodiments may be used as part of any e2e session-enhancing services framework for mobile or wireless and wireline communications. End-to-end session-enhancing services can be dynamically added and removed according to the need of applications and existing and changing conditions without affecting the on-going communication and the applications running on both end nodes.

32 Claims, 3 Drawing Sheets

Architecture of e2e session-enhancing services framework supporting applications at middleware level

OTHER PUBLICATIONS

V. Zandy, B. Miller, "*Reliable Networks Connections*", ACM MOBICOM'02, Sep. 2002.

X. Qu, J. Xu Yu, R. Brent, "*A Mobile TCP Socket*", International Conference on Software Engineering (SE'97), Nov. 1997.

A. Snoeren, "*A Session-Based Architecture for Internet Mobility*", Ph.D. Thesis, MIT, Feb'03.

J. Salz, A Snoeren, H. Balakrishnan, "*TESLA: A Transparent, Extensible Session-Layer Architecture for End-to-end Network Services*", 4th USENIX Symposium on Internet Technologies and Systems (USITS'03), Mar. 2003.

D. Maltz and P. Bhagwat, "*MSOCKS: An Architecture for Transport Layer Mobility*", IEEE Infocom, 1998.

B. Landfeldt, T. Larsson, Y. Ismailov, and A. Seneviratne, "*SLM, A Framework for Session Layer Mobility Management*", 8th IEEE Int'l Conf. on Computer Comm'ns and Networks (ICCCN), Oct. 1999.

E. Wedlund and H. Schulzrinne, "*Mobility Support Using SIP*", ACM Workshop on Wireless Mobile Multimedia (WoWMoM) 1999.

* cited by examiner

FIG. 1

Mechanism for Session Negotiation at TCP Session Establishment

FIG. 2

Mechanism for Session Re-Negotiation During an Active TCP Session

SYSTEMS, NODES, AND METHODS FOR DYNAMIC END-TO-END SESSION-ENHANCING SERVICES FOR TRANSPORT-LEVEL-BASED CONNECTIONS

CROSS-REFERENCE TO RELATED APPLICATION

This application claims priority to and the benefit of the filing date of provisional application entitled "System and Method for Dynamic End-to-End Session-Enhancing Services for TCP-Based Sessions," assigned Ser. No. 60/592,884 and filed Jul. 30, 2004, which is hereby incorporated by reference.

FIELD OF THE INVENTION

The present invention relates generally to end-to-end (e2e) session-enhancing (SE) services and, more particularly, embodiments of the present invention relate to systems and methods for enabling dynamic e2e-SE services for transport-level connections such as TCP-based connection sessions.

BACKGROUND

Transmission Control Protocol (TCP) is commonly used for transport-level connections for communicating data over a network, such as the Internet which uses Internet Protocol (IP) with TCP to form the commonly referred to TCP/IP transport protocol. TCP communications may be interrupted or expire for any number of reasons. Particularly in the mobile environment, TCP connections and communication performance may be adversely affected by conditions such as signal fluctuations, limited range of wireless technologies, mobility and roaming between access points which may cause a change in the underlying communication technology such as switching from a GPRS wide area network (WAN) connectivity to a wireless local area network (WLAN) connectivity, limited available bandwidth, and high round-trip delays. Accordingly, end-to-end (e2e) TCP connections between mobile stations, between mobile stations and servers, and between any network nodes, whether mobile or hardwired, can be negatively impacted. The effect of negative impact upon TCP connections also may negatively affect user experience of the mobile station or network node. For example, communications may be delayed, transfer rates may be slow to provide data, disconnections may occur, and applications may encounter errors such as stalling, hanging, and exiting with errors.

To address such problems, many solutions have been suggested to provide enhancements at different levels, including link-level enhancements such as GSM mobility, network-level enhancements such as Mobile IP (see, e.g., C. Perkins, *IP Mobility Support for IPv4*, RFC 3220, Internet Engineering Task Force, January 2002), transport-level enhancements such as TCP Optimizations for Wireless or MSOCKETS (see, e.g., D. Maltz and P. Bhagwat, *MSOCKS: An Architecture for Transport Layer Mobility*, IEEE Infocom, 1998), and session-level enhancements such as Session Initiation Protocol-SIP (see, e.g., J. Rosenberg, H. Schulzrinne, G. Camarillo, A. Johnston, J. Peterson, R. Sparks, M. Handley, and E. Schooler, *SIP: Session Initiation Protocol*, RFC 3261, Internet Engineering Task Force, June 2002), SLM (see, e.g., B. Landfeldt, T. Larsson, Y. Ismailov, and A. Seneviratne, *SLM, A Framework for Session Layer Mobility Management*, 8th IEEE Int'l Conf. on Computer Comm'ns and Networks (ICCCN), October 1999), and SIP-based mobility (see, e.g., E. Wedlund and H. Schulzrinne, *Mobility Support Using SIP*, ACM Workshop on Wireless Mobile Multimedia (WoWMoM) 1999). Further, infrastructure has been developed to support TCP connections, including some of the above mentioned level enhancements, such as enhancing networks with dedicated servers, proxies, and access points such as local area caches and Mobile Agents to act as proxy nodes on behalf of mobile stations.

Adding infrastructure may not be available for such situations as ad hoc communications sessions which may be purely ad hoc or may include partially ad hoc networking and partially infrastructure-supported networking, peer-to-peer TCP/IP applications, proximity networking, and unmanaged home networking. Similarly, new enhancements to support transport level communications may require new infrastructure and software upgrades in network nodes at different levels. Accordingly, another approach to addressing transport level communications problems is to provide e2e mobility enhancements to support the connection to prevent disconnections at the TCP socket level such as MobileSocket (see, e.g., T. Okoshi, M. Mochizuki, Y. Tobe, and H. Tokuda, *MobileSocket: Towards Continuous Operation for Java Applications*, IEEE Int'l Conf. on Computer Comm'ns and Networks (ICCCN), 1999), ROCKS/RACKS (see, e.g., V. Zandy and B. Miller, *Reliable Network Connections*, ACM MOBICOM, September 2002), Mobile TCP Sockets (see, e.g., X. Qu, J. Xu Yu, and R. Brent, *A Mobile TCP Socket*, Int'l Conf. on Software Engineering (SE), November 1997), and Migrate (see, e.g., A. Snoeren, *A Session-Based Architecture for Internet Mobility*, Ph.D. Thesis, MIT, February 2003). As used herein, these types of end-to-end (e2e) services are referred to as end-to-end session enchancing (e2e-SE) services. Further, the use of these types of service frameworks may be referred to as middleware. Middleware typically refers to the software, applications, routines, and the like which operate at a middleware level to function between application layers and system or operating system layers to assist communications between application layers of different end nodes, whether performed entirely by or at the end node or, possibly, by a proxy acting with an end node. The use of middleware is intended to improve communications ultimately transmitted to and from the application layer, but designed to function as an intermediary between the application layer and communications across a network to address inconsistencies and problems resulting from direct communications between applications layers across a network. Middleware interposes between the applications and the native system networking support. Some middleware is visible to applications, possibly requiring applications to be re-compiled to use new libraries. Other middleware is transparent or invisible to the applications and provide services to support the application layer without needing to re-compile or re-link the application. For example, the Transparent, Extensible Session-Layer Architecture (TESLA) for End-to-End Network Services is a middleware framework which generalizes end-to-end transparent network services (see, e.g., J. Salz, A. Snoeren, and H. Balakrishnan, *TESLA: A Transparent, Extensible Session-Layer Architecture for End-to-end Network Services*, 4th USENIX Symposium on Internet Technologies and Systems (USITS), March 2003) such as the described e2e-SE services.

Middleware provides applications with a virtual socket interface though which the application can communicate. Using a virtual socket allows the actual network sockets to be destroyed and replaced as may occur and as may be necessary such as to deal with IP address changes, disconnections, and TCP expirations. A virtual socket isolates the applications from what is happening at the networking layer. Thus, instead of an application opening an actual (real) networking socket, the application opens a socket to the middleware which is a virtual networking socket between the application and the middleware layers, and the middleware opens an actual networking socket with the network (system) layer where the middleware may create and destroy actual network connections without affecting the application, therefore isolating the application layer from the network layer. A virtual socket may even be transparent to the application, the application believing that it is using an actual socket as opposed to a virtual socket. In some approaches, the application may be aware of the virtual socket and that the middleware is controlling the communications for the application. Middleware permits the end node to monitor and support the actual communication connection for disconnections and other infirmities and protect the applications of the application layer from the problems related to the communication connection such as problems related to TCP connections in the mobile environment. Of particular note about middleware is that using middleware does not require any support from infrastructure or intermediate nodes. Rather, middleware resides in each of the end nodes to allow the end nodes to collaborate regarding the manner in which the middleware will function to support network communications for the applications. Essentially, the intelligence for supporting the communication is moved from infrastructure into the end nodes. Thus, middleware is a suitable solution for transport level connections including ad hoc scenarios and scenarios without infrastructure support.

In addition to typical e2e-SE services such as support for mobility and against disconnections, other e2e-SE services which further enhance communication sessions may be offered for middleware frameworks, including e2e compression and e2e encryption services. For example, e2e compression may increase download completions, possibly transparent to the application layer. Similarly, although the application may not require encryption, the middleware communicating for the application may use e2e-SE services which provide encryption for the communications, transparent or otherwise to the application. Additional other e2e-SE services may become available for middleware frameworks to support transport level communications.

Currently, e2e-SE services are provided on a static basis, where middleware establishes communications based upon known, fixed e2e-SE services. Accordingly, to function properly, the communicating middleware of each end node has to know which e2e-SE services will be used, otherwise the nodes cannot communicate using the e2e-SE services. And each time a connection is created, such as after a TCP expiration, the middleware of the end nodes establishes the connection using the same e2e-SE services. Further, situations may change or develop between end nodes communicating using middleware which mandates or would benefit from changing the e2e-SE services operating at the middleware layer on each end node. For example, when a mobile station roams from its home network into another network, the mobile station may want to enable e2e encryption. Using current static e2e-SE services for middleware prevents e2e-SE services from changing once the session has been established.

Accordingly, there is a need in the art for an improved framework for end-to-end (e2e) session-enhancing services for transport-level connections such as to deal with constraints such as those described above including use of a static set of e2e session-enhancing services.

SUMMARY

In light of the foregoing background, embodiments of the present invention provide improved systems and methods for enabling dynamic end-to-end (e2e) session-enhancing (SE) services for transport-level connections such as TCP-based connection sessions, thereby providing the communicating entities the ability to select, adjust, and control e2e session enhancing (e2e-SE) services before and during communications. An embodiment of the present invention may allow for dynamic negotiation and renegotiation of e2e session-enhancing services at establishment of and during the active course of communication sessions, such as at establishment of and during transparent e2e-SE services TCP connections. Embodiments of the present invention may be used as part of any e2e session-enhancing services framework for mobile or wireless and fixed or hardwired communications. By way of example, the embodiment of the present invention may provide a way to negotiate an initial supported set of e2e-SE services when establishing a communication session and a way to renegotiate the e2e-SE services used by the middleware during an ongoing communication session. Thus, session-enhancing services can be dynamically added and removed according to the need of applications and existing and changing conditions without affecting the on-going communication and the applications running on both end nodes.

Embodiments of methods for negotiating e2e-SE services for transport level connections between at least two end nodes of the present invention are provided. An embodiment of a method for negotiating e2e-SE services of the present invention may include the steps of initiating a communication session at the first end node and with the second end node, negotiating a selected set of e2e-SE services with the second end node, and initiating a transport level connection with the second end node using the selected set of e2e-SE services. By way of example, embodiments of methods for negotiating e2e-SE services of the present invention may also include one or more or the steps of suggesting a set of proposed e2e-SE services to the second end node, receiving an acknowledgment of a selected set of e2e-SE services, receiving a suggested alternate set of proposed e2e-SE services from the second end node in response to the suggested set of proposed e2e-SE services and which is different from the set of proposed e2e-SE services suggested by the first end node, and responding with available and acceptable e2e-SE services from among the set of alternative proposed e2e-SE services. Additional or alternative steps may be included in other embodiments of methods for negotiating e2e-SE services.

Embodiments of methods of renegotiating end-to-end (e2e) session enhancing (SE) services for transport level connections between at least two end nodes of the present invention are also provided. An embodiment of a method for renegotiating e2e-SE services of the present invention may include the steps of interrupting an ongoing transport-level connection, negotiating a renegotiated set of e2e-SE services, and re-establishing a transport level connection with the second end node using a renegotiated set of e2e-SE services. By way of example, embodiments of methods for renegotiating e2e-SE services of the present invention may also include one or more or the steps of receiving an acknowledgment of approval of the requested change to the negotiated set of e2e-SE services to define the renegotiated set of e2e-SE services, receiving a suggested alternate set of proposed e2e-SE services in response to and which is different from the transmitted requested change to the negotiated set of e2e-SE services, suggesting a second alternate set of proposed e2e-SE services in response to and which is different from the received suggested alternate set of proposed e2e-SE services, and receiving an acknowledgment of approval of the suggested second alternate set of proposed e2e-SE services to define the renegotiated set of e2e-SE services. Additional or alternative steps may be included in other embodiments of methods for re-negotiating e2e-SE services.

Embodiments of nodes and computer program products of the present invention are also provided which may support and perform steps for negotiating and renegotiating e2e-SE services as described above, and described further herein, with reference to embodiments of methods of the present invention. For example, an embodiment of a node of the present invention may include a controller capable of negotiating or renegotiating e2e-SE services for a transport level connection, possibly as directed by a session negotiation or renegotiation manager which may be part of a middleware layer of the node.

These characteristics, as well as additional details, of the present invention are further described herein with reference to these and other embodiments.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention may be in the field of mobile phone communications, it will be appreciated from the following description that the invention is also useful for various other types of wireless and wireline (wired, fixed, or hardwired) transport level communications other than mobile phone communications. Further, while a primary use of mobile stations of the present invention may be in the field of mobile phone technology, it will be appreciated from the following that many types of devices that are generally referenced herein as mobile stations, including, for example, mobile phones, pagers, handheld data terminals and personal data assistants (PDAs), portable personal computer (PC) devices, electronic gaming systems, global positioning system (GPS) receivers, satellites, and other portable electronics, including devices that are combinations of the aforementioned devices may be used with the present invention. Further, while embodiments of the present invention are described with reference to mobile TCP transport level communications, the present invention may be used by alternate embodiments for other wireless and hardwired transport level communication architectures which function to support communications between end nodes, including without limitation User Datagram Protocol (UDP) transport level communications and other transport level communications, now known and further developed.

Figure 1:
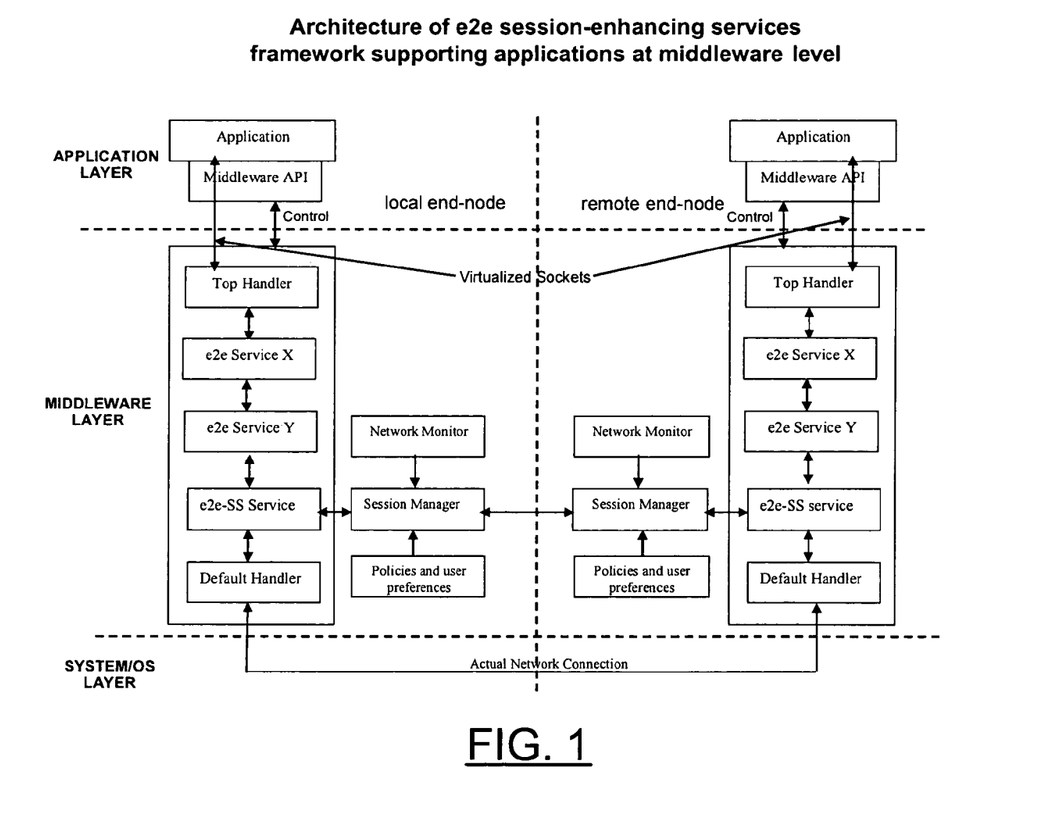
FIG. 1 is a block diagram of one type of end-to-end (e2e) session-enhancing services framework that would benefit from an embodiment of the present invention.

FIG. 1 is an illustration of one type of system that would benefit from an embodiment of the present invention. The figure represents two end nodes, a local end-node and a remote end-node. Each end node includes an application layer, a middleware layer, and a system or operating system layer which may also be referred to as the network layer. The application layer communicates with the middleware layer through a socket such as a virtualized socket controlled by a middleware API. Different types of transparent and non-transparent virtual sockets between the application layer and middleware layer may be used with embodiments of the present invention. The middleware layer communicates with the system layer through an actual network socket for the actual network communications between the end nodes. The middleware layer may include a middleware which defines a top handler to control the virtual socket communications with the application layer and a default handler to control the communications with the actual network socket communications with the network layer. The middleware may also define session-enhancing services such as traditional end-to-end session enhancing (e2e-SE) services and additional session-enhancing services, indicated as e2e Service X and e2e Service Y, such as e2e compression and e2e encryption services. As used herein, all session-enhancing services are generally referred to as e2e-SE services, and may also be known as end-to-end session support (e2e-SS) services. The middleware may be controlled by a session manager which monitors the network, such as using a network monitor module. The session manager may include a separate module to monitor and provide policies and user preferences for middleware operation such as available, required, and preferred e2e-SE services of the end node. The session managers of the end nodes communicate to establish a communication session between the end nodes. However, by comparison to current session managers which use static e2e-SE services, embodiments of the present invention include session managers which are capable of dynamically negotiating and renegotiating e2e-SE services for communication sessions. It should be noted that while a middleware layer and a session manager, negotiation manager, and/or renegotiation manager of an embodiment of the present invention is typically included at and operated by an end node such as a mobile phone, embodiments of the present invention may operate in distributed fashion such as where an end node is representative of a network node which operates using a proxy to manage its communications and, thereby, the middleware layer and/or session manager, negotiation manager, and/or renegotiation manager for the end node may be included at and/or be operated by the proxy rather than the network end node. Accordingly, reference herein to an end node of an embodiment of the present invention is inclusive of embodiments having central or distributed hardware and/or software configurations for supporting a transport level-based communication for an end node, whether located at and/or operated by the end node or a proxy for the end node, or a combination thereof.

Embodiments of the present invention may be separated into two mechanisms: a first mechanism providing dynamic negotiation of e2e session-enhancing services between two end nodes establishing a communication session and a second mechanism providing dynamic renegotiation of (negotiating a renegotiated set of) e2e session-enhancing services between two end nodes during the course of an active communication session. Both of these mechanisms may be included to add functionality to a session manager module of end nodes. Further, both of these mechanisms may be included as part of a transport level connection middleware layer to provide enhanced communication services to application layers. As a non-limiting example, an embodiment of the present invention may be instantiated for Java applications running on Java-enabled mobile stations using J2ME. Other embodiments of the present invention may be instantiated in other environments and in other frameworks, including, as a non-limiting example, the TESLA/Migrate framework that offers e2e session-enhancing services to native applications running on Linux/Unix hosts. At least one e2e session-enhancing service may operate, including an e2e session-enhancing service which buffers in-flight data and keeps track of the number of bytes received and successfully sent. Because embodiments of the present invention are not related to the specific e2e session-enhancing services which are provided, an embodiment of the present invention will advantageously function with additional e2e session-enhancing services that may be later developed. Accordingly, a framework for session-enhancing services operating in accordance with the present invention may be expanded to include new services. As such, negotiation and renegotiation of the present invention may incorporate these new services, rather than having to update the known, static set of e2e-SE services in middleware of end nodes, as would be required by current systems and methods and would present communication failures where two end nodes attempt to communicate but the static set of e2e-SE services has been updated in the middleware of only one of the end nodes.

Figure 2:
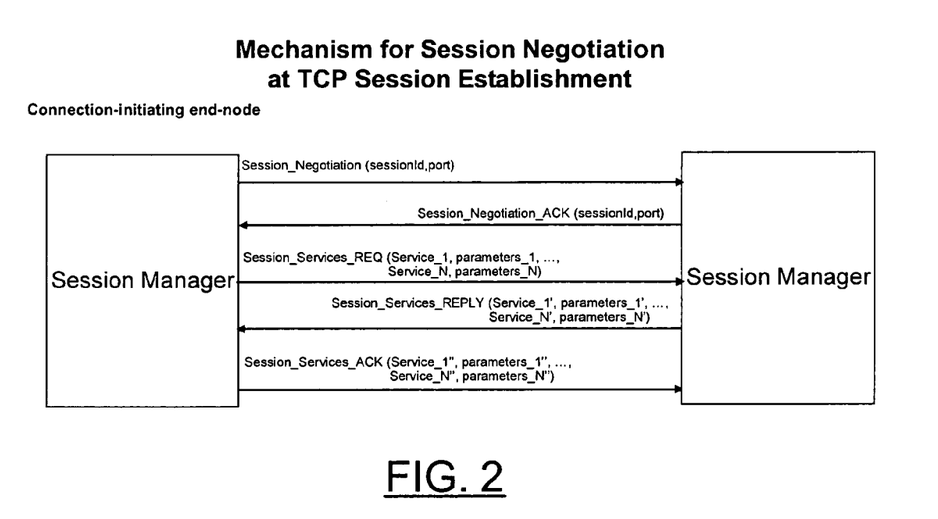
FIG. 2 is a control flow diagram illustrating e2e-SE services negotiation at TCP session establishment of one embodiment of the present invention.

FIG. 2 is a control flow diagram illustrating e2e-SE services negotiation at TCP session establishment of one embodiment of the present invention. When two end nodes attempt to establish a communication session using middleware operating in accordance with an embodiment of the present invention, the session managers of each end node communicate to negotiate which e2e-SE services will be used, rather than requiring both session managers to know and use a fixed, static set of e2e-SE services. The session manager of an end node initiating the communication session may send a session negotiation message, indicated in FIG. 2 as Session_Negotiation (sessionId,port), where the message may include such information as an identification for the communication session and a communication port number which is to be negotiated such as related port numbers and IP addresses of a TCP connection. The session manager of the receiving end node may provide a session negotiation acknowledgement, indicated in FIG. 2 as Session_Negotiation_ACK (sessionId,port), to acknowledge the request to establish a communication session by the initiating end node.

The initiating end node may then send a session service request, indicated in FIG. 2 as Session_Service_REQ (Service_1, parameters_1, ..., Service_N, parameters_N) where the session service request includes identification of requested e2e-SE services 1 to N with corresponding parameters for each of services 1 to N. The session manager of the receiving end node sends a session services reply, indicated in FIG. 2 as Session_Services_REPLY (Service_1', parameters_1', ..., Service_N', parameters_N). As indicated in the reply message, the services may be a different set of services than originally requested. For example, if the receiving end node does not support a particular e2e-SE service or parameter, the service must be removed from or the parameter changed in the set of e2e-SE services which will be used by the middleware of each end node. Further, the receiving end node may modify parameters of a service or may request additional services. This possibly modified set of services and parameters is transmitted by the session manager of the receiving end node to the session manager of the initiating end node. Just as the receiving end node has an opportunity to evaluate the initial set of requested services and parameters of the initiating end node, the initiation end node has an opportunity to evaluate the returned set of services and parameters of the receiving end node. If the initiating end node does not support any additionally requested services or parameters or would like to further modify the set of services and parameters, the initiating end node may send a reply to the receiving end node with a further modified set of services and parameters, and this process may continue until one of the session managers agrees to the set of services and parameters suggested by the other session manager, and at such time that session manager may send a session services acknowledgement. If the receiving end node agrees upon evaluation of the returned set of services and parameters of the receiving end node, or upon agreement by either session manager upon subsequent reply messages, the session manager may send a session services acknowledgement message, indicated in FIG. 2 as a Session_Services_ACK (Service_1", parameters_1", ..., Service_N", parameters_N"). Once the session negotiation completes, the set of session-enhancing services and parameters, agreed to by the session managers and acknowledged by one of the session managers as a set of intersecting and acceptable services and parameters, is instantiated in each end node, and communication begins. For example, the session-enhancing services operate on each network flow in the order specified. Further, by way of example, the information about the number of bytes successfully sent and the number of bytes received and written to the application may be maintained by the middleware and all of the in-flight data, all the data contained in TCP transmit and receive buffers, may be buffered at the middleware layer and retransmitted by the middleware layer as necessary even after, for example, an underlying TCP connection has expired.

Once the services and parameters have been negotiated for a communication session, each time a break occurs in the actual network connection such as a break in a TCP connection, the session managers may re-establish the communication using the negotiated set of services and parameters. Any break in the actual network connection also provides the session managers the opportunity to renegotiate the services and parameters to be used for the on-going communication session, as described more fully herein below. Thus, a default may be to re-establish the communication using the negotiated set of services and parameters, but if either end node wants to renegotiate the services and parameters, any break in a connection provides the opportunity to do so.

Figure 3:
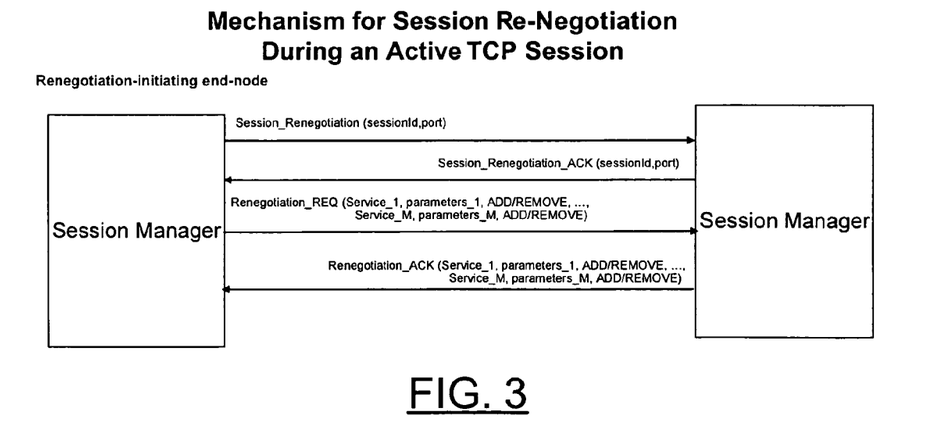
FIG. 3 is a control flow diagram illustrating e2e-SE services renegotiation during an active TCP session of one embodiment of the present invention.

FIG. 3 is a control flow diagram illustrating e2e-SE services renegotiation during an active TCP session of one embodiment of the present invention. During an on-going communication session, one of the end nodes may determine that it would like to change the current set of session-enhancing services and parameters. Situations may change or develop between end nodes communicating using middleware which mandates or would benefit changing the e2e-SE services and parameters operating at the middleware layer on one or more of the end nodes. For example, when a mobile station roams from its home network into another network, the mobile station may want to enable e2e encryption. Similarly, for example, if a communication session changes to begin downloading a large file such as from a server to a mobile station, the mobile station may want to enable e2e compression. Yet further examples may be where one end node switches from a cellular connection to a wireless LAN connection and where one end node switches from a low or high bandwidth connection to a high or low bandwidth connection, respectively. A network monitor module for a session manager, or another module in the middleware layer, may include policies which trigger or activate a renegotiation mechanism, such as network changes and situations described herein and the like.

To begin dynamic renegotiation of e2e-SE services and parameters, the end node initiating the renegotiation first tears down the existing connection, such as causing a disconnection of the TCP connection. The break in the actual network connection provides the session manager the opportunity to renegotiate the e2e-SE services and parameters, rather than using the previously negotiated set of services and parameters.

The end node initiating the renegotiation may send a session renegotiation message, indicated in FIG. 3 as Session_Renegotiation (sessionId,port), where the message may include such information as an identification for the communication session and a communication port number which is to be renegotiated such as related port numbers and IP addresses of an on-going TCP connection. The session manager of the receiving end node may provide a session renegotiation acknowledgement, indicated in FIG. 3 as Session_Renegotiation_ACK (sessionId,port), to acknowledge the request to dynamically modify an on-going communication session.

The end node initiating the renegotiation may then send a renegotiation request, indicated in FIG. 3 as Renegotiation_REQ (Service_1, parameters_1, ADD/REMOVE, . . . , Service_M, parameters_M, ADD/REMOVE), where a renegotiation request may include identification of requested e2e-SE services 1 to M with corresponding parameters for each of services 1 to M and indicate the particular change to the existing session and parameter set. A renegotiation request may include requested changes to services and parameters, including additions and removals of services and parameters. If the requested changes are acceptable to the receiving end node, the session manager of the receiving end node may transmit a renegotiation acknowledgement, indicated in FIG. 3 as Renegotiation_ACK (Service_1, parameters_1, ADD/REMOVE, Service_M, parameters_M, ADD/REMOVE). Alternatively, the session manager of the receiving end node may send a renegotiation reply, which could be represented as Renegotiation_REPLY (Service_1', parameters_1', ADD/REMOVE/MODIFY, . . . , Service_M', parameters_M', ADD/REMOVE/MODIFY) to add, remove, or modify a service or parameter to the set of requested renegotiated services and parameters. The services and parameters may be a different set of services than requested for renegotiation. Just as the session managers of the end nodes may negotiate services and parameters to establish a communication session, the session managers of the end nodes may renegotiate the services and parameters of the on-going communication system. For example, if the receiving end node does not support a particular e2e-SE service or parameter added in the renegotiation request, the service must be removed or the parameter removed from or modified in the set of e2e-SE services which will be used by the middleware of each end node. Further, the receiving end node may modify parameters of a service or may request additional services or services to be removed. This process may continue until one of the session managers agrees to a renegotiated set of services and parameters suggested by the other session manager, and at such time that session manager may send a renegotiation acknowledgement message. Once the renegotiation completes, the renegotiated set of session-enhancing services and parameters, agreed to by the session managers and acknowledged by one of the session managers as a set of intersecting and acceptable services and parameters, is instantiated in each end node, and communication continues.

By way of example, an FTP server and an FTP client may run on two end nodes, each supporting e2e TCP session-enhancing framework as depicted in FIG. 1. The FTP server may be configured to use e2e-SE, including e2e compression session-enhancing service. If a static e2e-SE framework is used, the FTP client must use the same e2e-SE, including e2e compression session-enhancing service. If, for example, the FTP client does not have an e2e compression session-enhancing service, the communication may not continue using static the static e2e-SE framework. However, using a dynamic e2e-SE framework of an embodiment of the present invention, the FTP client and FTP server may negotiate the e2e-SE services to be used, during which process the FTP client can negotiate with the FTP server not to use the e2e compression session-enhancing service because it is not available in the FTP client end node.

Negotiation and renegotiation at each end node may occur based upon a module which monitors and provides policies and user preferences for middleware operation such as available, required, and preferred e2e-SE services and parameters for the end node. As described, only services which are mutually supported, i.e., intersecting at each end node, may be applied.

Figure 4:
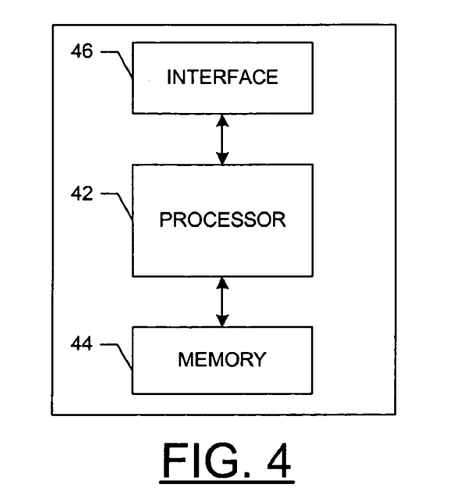
FIG. 4 is a schematic block diagram of an entity capable of operating as a mobile station, network node, or a Home Agent of an embodiment of the present invention.

Reference is now made to FIG. 4, which illustrates a block diagram of an entity capable of operating in accordance with dynamic e2e session-enhancing services negotiation and renegotiation of one embodiment of the present invention. As shown, the entity capable of operating in accordance with dynamic e2e session-enhancing services negotiation and renegotiation can generally include a processor, controller, or the like 42 connected to a memory 44. The memory 44 can include volatile and/or non-volatile memory and typically stores content, data, or the like. For example, the memory 44 typically stores computer program code such as software applications or operating systems, information, data, content, or the like for the processor 42 to perform steps associated with operation of the entity in accordance with embodiments of the present invention. Also, for example, the memory 44 typically stores content transmitted from, or received by, the network node. Memory 44 may be, for example, random access memory (RAM), a hard drive, or other fixed data memory or storage device. Where the entity provides wireless communication, such as a CDMA mobile network, the processor 42 may operate with a wireless communication subsystem (not shown), such as a cellular transceiver. The entity may further include at least one interface 46, such as a network interface, a radio transceiver, or other means for transmitting and/or receiving data, content or the like. The interface 46 may be connected to the processor 42. One or more processors, memory, storage devices, and other computer elements may be used in common by a computer system and subsystems, as part of the same platform, or processors may be distributed between a computer system and subsystems, as parts of multiple platforms.

Figure 5:
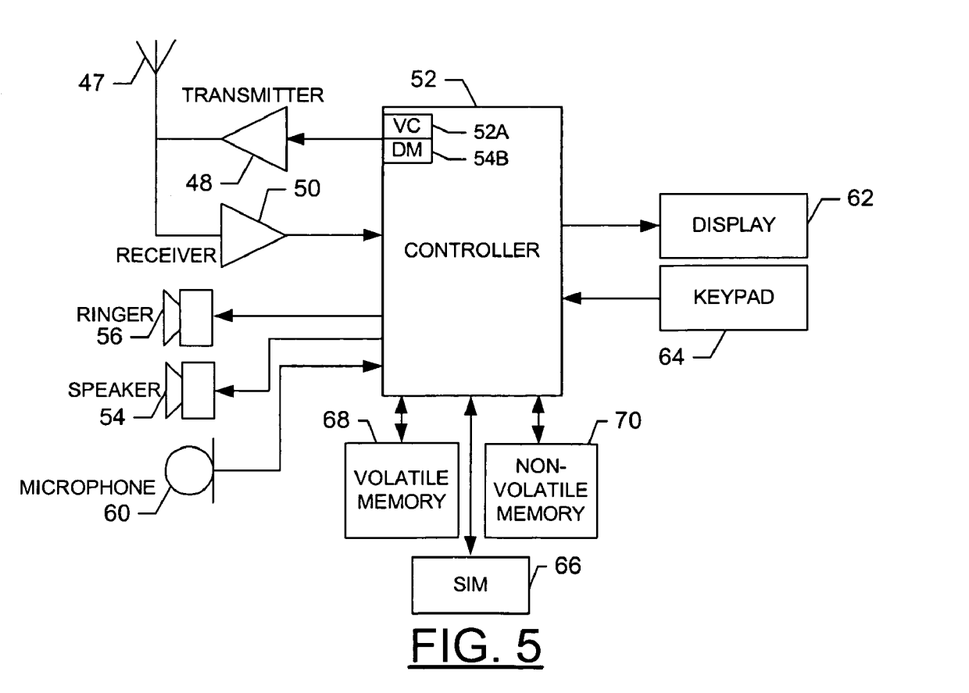
FIG. 5 is a schematic block diagram of a mobile station capable of operating in accordance with dynamic transport level session-enhancing service negotiation and renegotiation of an embodiment of the present invention.

FIG. 5 illustrates a functional diagram of a mobile device, or mobile station (MS) capable of operating in accordance with dynamic e2e session-enhancing services negotiation and renegotiation of an embodiment of the present invention. It should be understood, that the mobile device illustrated and hereinafter described is merely illustrative of one type of mobile station that would benefit from an embodiment of the present invention and, therefore, should not be taken to limit the scope of an embodiment of the present invention or the type of devices which may operate in accordance with an embodiment of the present invention. While several embodiments of the mobile device are hereinafter described for purposes of example, other types of mobile stations, such as portable digital assistants (PDAs), pagers, laptop computers, and other types of voice and text communications systems, can readily be employed to function with an embodiment of the present invention.

The mobile device includes an antenna 47, a transmitter 48, a receiver 50, and a controller 52 that provides signals to and receives signals from the transmitter 48 and receiver 50, respectively. These signals include signaling information in accordance with the air interface standard of the applicable cellular system, such as a pilot channel of a CDMA network, and also user speech and/or user generated data, such as transmitted by traffic channels of a CDMA network. In this regard, the mobile device can be capable of operating with one or more air interface standards, communication protocols, modulation types, and access types. More particularly, the mobile device can be capable of operating in accordance with any of a number of second-generation (2 G), 2.5 G and/or third-generation (3 G) communication protocols or the like. For example, the mobile device may communicate according to the CDMA 2000 standard and the Mobile IPv6 protocol standard. Additionally, for example, the mobile device may be capable of operating in accordance with 2 G wireless communication protocols IS-136 (TDMA), GSM and IS-95 (CDMA), 2.5 G wireless communication protocols such as GPRS and/or Enhanced Data GSM Environment (EDGE), and/or 3 G wireless communication protocols such as Universal Mobile Telephone System (UMTS) network employing Wideband Code Division Multiple Access (WCDMA) radio access technology. Also, for example, the mobile device can also be capable of operating in accordance with enhanced 3 G wireless communication protocols such as 1XEV-DO (TIA/EIA/IS-856) and 1XEV-DV. Further, for example, the mobile device can be capable of operating in accordance with any of a number of different wireless networking techniques, including WLAN techniques such as IEEE 802.11, WiMAX techniques such as IEEE 802.16 or the like.

It is understood that the controller 52, such as a processor or the like, includes the circuitry required for implementing the video, audio, and logic functions of the mobile device. For example, the controller may be comprised of a digital signal processor device, a microprocessor device, and various analog to digital converters, digital to analog converters, and other support circuits. The control and signal processing functions of the mobile device are allocated between these devices according to their respective capabilities. The controller 52 thus also includes the functionality to convolutionally encode and interleave message and data prior to modulation and transmission. The controller 52 can additionally include an internal voice coder (VC) 52A, and may include an internal data modem (DM) 52B. Further, the controller 52 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile device may also comprise a user interface such as including a conventional earphone or speaker 54, a ringer 56, a microphone 60, a display 62, all of which are coupled to the controller 52. The user input interface, which allows the mobile device to receive data, can comprise any of a number of devices allowing the mobile device to receive data, such as a keypad 64, a touch display (not shown), a microphone 60, or other input device. In embodiments including a keypad, the keypad can include the conventional numeric (0-9) and related keys (#, *), and other keys used for operating the mobile device and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile device can also include memory, such as a subscriber identity module (SIM) 66, a removable user identity module (R-UIM) (not shown), or the like, which typically stores information elements related to a mobile subscriber. In addition to the SIM, the mobile device can include other memory. In this regard, the mobile device can include volatile memory 68, as well as other non-volatile memory 70, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile device to implement the functions of the mobile device. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application, such as a software program or modules for an application, such as to implement a dynamic e2e session-enhancing services negotiation and renegotiation embodiment of the present invention, and may store an update for computer program code for the mobile device.

One of ordinary skill in the art will recognize that the present invention may be incorporated into hardware and software systems and subsystems, combinations of hardware systems and subsystems and software systems and subsystems, and incorporated into network systems and mobile stations thereof. In each of these systems and mobile stations, as well as other systems capable of using a system or performing a method of the present invention as described above, the system and mobile station generally may include a computer system including one or more processors that are capable of operating under software control to provide the techniques described above, including dynamic e2e session-enhancing services negotiation and renegotiation.

Computer program instructions for software control for embodiments of the present invention may be loaded onto a computer or other programmable apparatus to produce a machine, such that the instructions which execute on the computer or other programmable apparatus create means for implementing the functions described herein, such as a mobile station employing dynamic e2e session-enhancing services negotiation and renegotiation. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions described herein, such as a method for dynamic e2e session-enhancing services negotiation and renegotiation. It will also be understood that each block or element, and combinations of blocks and/or elements, can be implemented by hardware-based computer systems, software computer program instructions, or combinations of hardware and software which perform the specified functions or steps of establishing dynamic e2e session-enhancing services negotiation and renegotiation.

Herein provided and described are improved systems and methods for enabling dynamic end-to-end (e2e) session-enhancing services for transport-level connections such as TCP-based connection sessions, thereby providing the communicating entities the ability to select, adjust, and control e2e session enhancing (e2e-SE) services before and during communications. Embodiments of the present invention allow for dynamic negotiation and renegotiation of e2e session-enhancing services at establishment of and during the active course of communication sessions, such as at establishment of and during transparent e2e-SE services TCP connections. Embodiments of the present invention may be used as part of any e2e session-enhancing services framework for mobile or wireless and fixed or hardwired communications. End-to-end session-enhancing services can be dynamically added and removed according to the need of applications and existing and changing conditions without affecting the on-going communication and the applications running on both end nodes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    initiating a communication session by a first end node with a second end node;
    negotiating a selected set of end-to-end session enhancing (e2e-SE) services with the second end node, wherein the selected set of e2e-SE services has not been defined at the first and second end nodes prior to initiating the communication session between the first and second end nodes;
    initiating a transport level connection by a system layer of the first end node with the second end node whereby both the first and second end nodes use the selected set of e2e-SE services, wherein the system layer of the first end node is connected to a middleware layer of the first end node, which is connected to an application layer of the first end node through a socket; and
    providing, by the middleware layer of the first end node to the application layer of the first end node through the socket, the selected set of e2e-SE services by the middleware layer executing the selected set of e2e-SE services using a controller of the first end node and supporting the transport level connection of the system layer.

2. The method of claim 1, wherein negotiating an initial set of e2e-SE services comprises an iteration of communications between the first end node and the second end node to agree upon the selected set of e2e-SE services.

3. The method of claim 1, wherein negotiating an initial set of e2e-SE services comprises:
    suggesting a set of proposed e2e-SE services to the second end node; and
    receiving an acknowledgment of a selected set of e2e-SE services.

4. The method of claim 3, wherein negotiating an initial set of e2e-SE services further comprises:
    receiving a suggested alternate set of proposed e2e-SE services from the second end node in response to the suggested set of proposed e2e-SE services and which is different from the set of proposed e2e-SE services suggested by the first end node; and
    responding with available and acceptable e2e-SE services from among the set of alternative proposed e2e-SE services.

5. The method of claim 4, wherein responding with available and acceptable e2e-SE services from among the set of alternative proposed e2e-SE services includes eliminating a proposed e2e-SE service as not being available at the first end node.

6. A method, comprising:
    interrupting, by a first end node, an ongoing transport-level connection with a second end node;
    negotiating a renegotiated set of end-to-end session enhancing (e2e-SE) services, comprising transmitting a requested change to a negotiated set of e2e-SE services; reestablishing a transport level connection by a system layer of the first end node with the second end node whereby both the first and second end nodes use the renegotiated set of e2e-SE services, wherein the system layer of the first end node is connected to a middleware layer of the first end node, which is connected to an application layer of the first end node through a socket; and
    providing, by the middleware layer of the first end node to the application layer of the first end node through the socket, the renegotiated set of e2e-SE services by the middleware layer executing the renegotiated set of e2e-SE services using a controller of the first end node and supporting the reestablished transport level connection of the system layer.

7. The method of claim 6, wherein negotiating a requested change to a negotiated set of e2e-SE services comprises an iteration of communications between the first end node and the second end node to agree upon the renegotiated set of e2e-SE services.

8. The method of claim 6, wherein negotiating a requested change to a negotiated set of e2e-SE services further comprises:
    receiving an acknowledgment of approval of the requested change to the negotiated set of e2e-SE services to define the renegotiated set of e2e-SE services.

9. The method of claim 6, wherein negotiating a requested change to a negotiated set of e2e-SE services further comprises:

receiving a suggested alternate set of proposed e2e-SE services in response to and which is different from the transmitted requested change to the negotiated set of e2e-SE services;
suggesting a second alternate set of proposed e2e-SE services in response to and which is different from the received suggested alternate set of proposed e2e-SE services; and
receiving an acknowledgment of approval of the suggested second alternate set of proposed e2e-SE services to define the renegotiated set of e2e-SE services.

10. The method of claim 6, wherein negotiating a requested change to a negotiated set of e2e-SE services further comprises:
receiving a suggested alternate set of proposed e2e-SE services in response to and which is different from the transmitted requested change to the negotiated set of e2e-SE services; and
transmitting an acknowledgment of approval of the suggested alternate set of e2e-SE services to define the renegotiated set of e2e-SE services.

11. The method of claim 6, wherein transmitting a requested change includes requesting the deletion of at least one of the e2e-SE services in the negotiated set of e2e-SE services.

12. The method of claim 6, wherein transmitting a requested change includes requesting the addition of at least one e2e-SE service to the negotiated set of e2e-SE services.

13. A node, comprising:
a controller configured to negotiate end-to-end (e2e) session enhancing (SE) services for establishing a transport level connection, the negotiated e2e-SE services being available to the controller;
a middleware layer operating in communication with the controller and configured to provide the e2e-SE services available to the controller;
an application layer connected to the middleware layer through a socket; and
a system layer connected to the middleware layer for providing a communication session for the middleware layer of one end node with the other end node, and wherein the middleware layer is configured to execute, using the controller, e2e-SE services negotiated by the controller for supporting the transport level connection of the system layer communication session and thereafter provided through the socket to the application layer.

14. The node of claim 13, further comprising a session negotiation manager configured to direct the operation of the controller to negotiate e2e-SE services for establishing the transport level connection.

15. The node of claim 13, wherein the controller is further configured to negotiate e2e-SE services by sending a request for a set of proposed e2e-SE services, evaluating any other e2e-SE services that differ from the set of proposed e2e-SE services and that are provided by another node in response to the request for a set of proposed e2e-SE services, and acknowledging a selected set of e2e-SE services; and wherein the controller is further configured to establish the transport level connection using the selected set of e2e-SE services.

16. The node of claim 13, further comprising a session negotiation manager configured to direct the operation of the controller to negotiate e2e-SE services for establishing the transport level connection, wherein the session negotiation manager is a part of the middleware layer.

17. A node, comprising:
a controller configured to renegotiate end-to-end (e2e) session enhancing (SE) services for re-establishing a transport level connection using a renegotiated set of e2e-SE services, the renegotiated e2e-SE services being available to the controller;
a middleware layer operating in communication with the controller and configured to provide the renegotiated e2e-SE services available to the controller;
an application layer connected to the middleware layer through a socket;
a system layer connected to the middleware layer for providing a communication session for the middleware layer of one end node with the other end node, and wherein the middleware layer is configured to execute, using the controller, renegotiated e2e-SE services renegotiated by the controller for supporting the re-established transport level connection of the system layer communication session and thereafter provided through the socket to the application layer.

18. The node of claim 17, further comprising a session renegotiation manager configured to direct the operation of the controller to renegotiate e2e-SE services for re-establishing the transport level connection.

19. The node of claim 17, wherein the controller is further configured to renegotiate e2e-SE services by interrupting an ongoing transport-level connection and transmitting a requested change to a negotiated set of e2e-SE services;
and wherein the controller is further configured to re-establish a transport level connection using the renegotiated set of e2e-SE services.

20. The node of claim 17, further comprising a session renegotiation manager configured to direct the operation of the controller to renegotiate e2e-SE services for re-establishing the transport level connection, wherein the session renegotiation manager is a part of the middleware layer.

21. A computer program product comprising a computer readable storage medium having computer-readable program code embodied in the medium, and wherein the computer-readable program code comprises:
first computer program code for initiating a communication session by a first end node with a second end node;
second computer program code for negotiating a selected set of end-to-end session enhancing (e2e-SE) services with the second end node, wherein the selected set of e2e-SE services has not been defined at the first and second end nodes prior to initiating the communication session between the first and second end nodes;
third computer program code for initiating, by a system layer of the first end node, a transport level connection with the second end node whereby both the first and second end nodes use the selected set of e2e-SE services, wherein the system layer of the first end node is connected to a middleware layer of the first end node, which is connected to an application layer of the first end node through a socket; and
fourth computer program code for providing, by the middleware layer of the first end node to the application layer of the first end node through the socket, the selected set of e2e-SE services by the middleware layer executing the selected set of e2e-SE services using a controller of the first end node and supporting the transport level connection of the system layer.

22. A computer program product according to claim 21, wherein the second computer program code comprises code for iteratively communicating between the first end node and the second end node to agree upon the selected set of e2e-SE services.

23. A computer program product according to claim 21, wherein the second computer program code comprises code for suggesting a set of proposed e2e-SE services to the second end node and code for receiving an acknowledgment of a selected set of e2e-SE services.

24. A computer program product according to claim 23, wherein the second computer program code further comprises code for:
receiving a suggested alternate set of proposed e2e-SE services from the second end node in response to the suggested set of proposed e2e-SE services and which is different from the set of proposed e2e-SE services suggested by the first end node; and
responding with available and acceptable e2e-SE services from among the set of alternative proposed e2e-SE services.

25. A computer program product according to claim 24, wherein the code for responding with available and acceptable e2e-SE services from among the set of alternative proposed e2e-SE services includes code for eliminating a proposed e2e-SE service as not being available at the first end node.

26. A computer program product comprising a computer readable storage medium having computer-readable program code embodied in the medium, and wherein the computer-readable program code comprises:
first code for interrupting, by a first end node, an ongoing transport-level connection with a second end node;
second code for negotiating a renegotiated set of end-to-end session enhancing (e2e-SE) services and further comprising code for transmitting a requested change to a negotiated set of e2e-SE services;
third code for reestablishing, by the first end node, a transport level connection with the second end node whereby both the first and second end nodes use the renegotiated set of e2e-SE services, wherein the system layer of the first end node is connected to a middleware layer of the first end node, which is connected to an application layer of the first end node through a socket; and
fourth code for providing, by the middleware layer of the first end node to the application layer of the first end node through the socket, the renegotiated set of e2e-SE services by the middleware layer executing the renegotiated set of e2e-SE services using a controller of the first end node and supporting the reestablished transport level connection of the system layer.

27. A computer program product according to claim 26, wherein the second computer program code comprises code for iteratively communicating between the first end node and the second end node to agree upon the renegotiated set of e2e-SE services.

28. A computer program product according to claim 26, wherein the second computer code further comprises code for receiving an acknowledgment of approval of the requested change to the negotiated set of e2e-SE services to define the renegotiated set of e2e-SE services.

29. A computer program product according to claim 26, wherein the second computer code further comprises code for:
receiving a suggested alternate set of proposed e2e-SE services in response to and which is different from the transmitted requested change to the negotiated set of e2e-SE services;
suggesting a second alternate set of proposed e2e-SE services in response to and which is different from the received suggested alternate set of proposed e2e-SE services; and
receiving an acknowledgment of approval of the suggested second alternate set of proposed e2e-SE services to define the renegotiated set of e2e-SE services.

30. A computer program product according to claim 26, wherein the second computer code further comprises code for:
receiving a suggested alternate set of proposed e2e-SE services in response to and which is different from the transmitted requested change to the negotiated set of e2e-SE services; and
transmitting an acknowledgment of approval of the suggested alternate set of e2e-SE services to define the renegotiated set of e2e-SE services.

31. A computer program product according to claim 26, wherein the second computer code further comprises code for requesting the deletion of at least one of the e2e-SE services in the negotiated set of e2e-SE services.

32. A computer program product according to claim 26, wherein the second computer code further comprises code for requesting the addition of at least one e2e-SE service to the negotiated set of e2e-SE services.

* * * * *

UNITED STATES PATENT AND TRADEMARK OFFICE
CERTIFICATE OF CORRECTION

PATENT NO. : 7,574,510 B2 Page 1 of 1
APPLICATION NO. : 11/167245
DATED : August 11, 2009
INVENTOR(S) : Kalofonos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Seventh Day of September, 2010

David J. Kappos
*Director of the United States Patent and Trademark Office*